US010368346B2

(12) United States Patent
Luo et al.

(10) Patent No.: US 10,368,346 B2
(45) Date of Patent: Jul. 30, 2019

(54) DYNAMIC SUBFRAME STRUCTURE

(71) Applicant: QUALCOMM Incorporated, San Diego, CA (US)

(72) Inventors: Tao Luo, San Diego, CA (US); Naga Bhushan, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 15/086,655

(22) Filed: Mar. 31, 2016

(65) Prior Publication Data

US 2017/0127396 A1     May 4, 2017

Related U.S. Application Data

(60) Provisional application No. 62/248,664, filed on Oct. 30, 2015.

(51) Int. Cl.
*H04W 72/04*       (2009.01)
*H04L 5/14*         (2006.01)
(Continued)

(52) U.S. Cl.
CPC ........ *H04W 72/044* (2013.01); *H04B 7/0452* (2013.01); *H04L 5/14* (2013.01);
(Continued)

(58) Field of Classification Search
CPC ....... H04W 72/044; H04B 7/0452; H04L 5/14
(Continued)

(56) References Cited

U.S. PATENT DOCUMENTS

2003/0214967 A1* 11/2003 Heberling ............. H04W 24/00
                                                                 370/437
2012/0120826 A1* 5/2012 Hao ..................... H04L 5/0023
                                                                 370/252

(Continued)

OTHER PUBLICATIONS

Eeva L., et al., "On the TDD subframe structure for beyond 4G radio access network", 2013 Future Network & Mobile Summit, Authors, Jul. 3, 2013 (Jul. 3, 2013), pp. 1-10.

(Continued)

*Primary Examiner* — Stephen J Clawson
(74) *Attorney, Agent, or Firm* — Loza & Loza LLP

(57) ABSTRACT

Various aspects provide for receiving signaling including information configured to indicate whether to adjust a structure of a time-division duplex (TDD) subframe. Such adjusting may include adjusting a time or subcarrier allocated for a control channel, data, and/or a reference signal, such as a user equipment (UE)-specific reference signal (UERS). The UERS may be time-aligned with a demodulation reference signal (DMRS) of another TDD subframe. The UERS may be utilized for inter-link multi-user multiple-input multiple-output (MU-MIMO) when the UERS is orthogonal to the DMRS. Various other aspects provide for communicating one or more pilot or null tones in a data portion of a first TDD subframe. The one or more pilot or null tones may be used to capture interference from a second TDD subframe communicated by another apparatus. The first TDD subframe may be communicated at least partially concurrent with the second TDD subframe.

14 Claims, 9 Drawing Sheets

(51) Int. Cl.
*H04B 7/0452* (2017.01)
*H04L 5/00* (2006.01)

(52) U.S. Cl.
CPC .......... *H04L 5/1469* (2013.01); *H04L 5/0044* (2013.01); *H04L 5/0051* (2013.01); *H04L 5/0053* (2013.01); *H04L 5/0096* (2013.01)

(58) Field of Classification Search
USPC ........................................................ 370/280
See application file for complete search history.

(56) References Cited

U.S. PATENT DOCUMENTS

2014/0098720 A1* 4/2014 Zeng ................ H04W 72/0446
    370/280
2014/0334355 A1* 11/2014 Ekpenyong .............. H04B 1/56
    370/280

OTHER PUBLICATIONS

"International Search Report and Written Opinion—PCT/US2016/059216—ISA/EPO—dated Mar. 21, 2017."
Toni L., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415 [retrieved on Sep. 22, 2014].

* cited by examiner

DYNAMIC SUBFRAME STRUCTURE

CROSS-REFERENCE TO RELATED APPLICATION

This application claims priority to and benefit of provisional patent application No. 62/248,664 filed in the United States Patent and Trademark Office on Oct. 30, 2015, the entire content of which is hereby incorporated herein by reference.

TECHNICAL FIELD

Aspects of the present disclosure relate, generally, to wireless communication systems and, more particularly, to a dynamic structure for a time-division duplex (TDD) subframe.

BACKGROUND

Wireless communication networks are widely deployed to provide various communication services such as telephony, video, data, messaging, broadcasts, and so on. Such networks, which are usually multiple access networks, support communications for multiple users by sharing the available network resources. Within such wireless networks a variety of data services may be provided, including voice, video, and emails. Such networks, which are usually multiple access networks, support communication for multiple users by sharing the available network resources. The spectrum allocated to such wireless communication networks can include licensed spectrum and/or unlicensed spectrum. Licensed spectrum is generally restricted in its use for wireless communication except for licensed use as regulated by a governmental body or other authority within a given region. Unlicensed spectrum is generally free to use, within limits, without the purchase or use of such a license. As the demand for mobile broadband access continues to increase, research and development continue to advance wireless communication technologies to meet the growing demand for mobile broadband access and to enhance the overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the present disclosure provides an apparatus for wireless communication utilizing a time-division duplex (TDD) carrier comprising a plurality of TDD subframes. The apparatus includes a transceiver, a memory, and at least one processor communicatively coupled to the transceiver and the memory. In some examples, the at least one processor may be configured to utilize the transceiver to receive signaling comprising information configured to indicate whether to adjust a structure of a TDD subframe. In some other examples, the at least one processor may be configured to utilize the transceiver to communicate one or more pilot or null tones in a data portion of a first TDD subframe, wherein the one or more pilot or null tones are used to capture interference from a second TDD subframe communicated by another apparatus.

In another aspect, the present disclosure provides a method for wireless communication utilizing a TDD carrier comprising a plurality of TDD subframes. In some examples, the method may include receiving signaling comprising information configured to indicate whether to adjust a structure of a TDD subframe. In some other examples, the method may include communicating one or more pilot or null tones in a data portion of a first TDD subframe, wherein the one or more pilot or null tones are used to capture interference from a second TDD subframe communicated by another apparatus.

In yet another aspect, the present disclosure provides a computer-readable medium storing computer-executable code. The computer-executable code may be configured to utilize a TDD carrier comprising a plurality of TDD subframes. In some examples, the computer-executable code may include instructions configured to receive signaling comprising information configured to indicate whether to adjust a structure of a TDD subframe. In some other examples, the computer-executable code may include instructions configured to communicate one or more pilot or null tones in a data portion of a first TDD subframe, wherein the one or more pilot or null tones are used to capture interference from a second TDD subframe communicated by another apparatus.

In a further aspect of the present disclosure, the present disclosure provides an apparatus for wireless communication utilizing a TDD carrier comprising a plurality of TDD subframes. In some examples, the apparatus may include means for receiving signaling comprising information configured to indicate whether to adjust a structure of a TDD subframe. In some other examples, the apparatus may include means for communicating one or more pilot or null tones in a data portion of a first TDD subframe, wherein the one or more pilot or null tones are used to capture interference from a second TDD subframe communicated by another apparatus.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, certain structures and components are shown in block diagram form in order to avoid obscuring such concepts.

The concepts presented throughout this disclosure may be implemented across a broad variety of telecommunication systems, network architectures, and communication standards. The 3rd Generation Partnership Project (3GPP) is a standards body that defines several wireless communication standards for networks involving an evolved packet system (EPS), which may sometimes be referred to as long-term evolution (LTE) network. In an LTE network, packets may utilize the same or similar latency targets. As such, an LTE network may provide a one-size-fits-all latency configuration. Evolved versions of an LTE network, such as a fifth-generation (5G) network, may provide many different types of services and/or applications (e.g., web browsing, video streaming, VoIP, mission critical applications, multi-hop networks, remote operations with real-time feedback, tele-surgery, and others).

Figure 1:
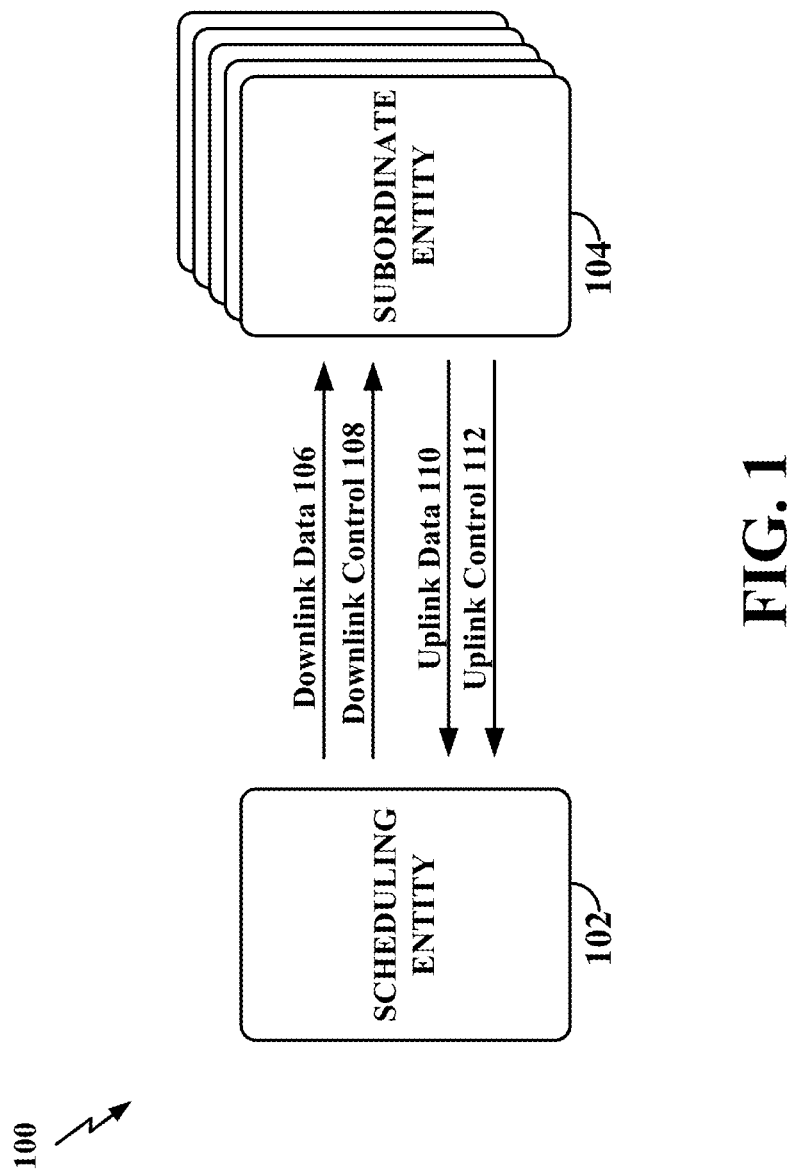
FIG. 1 is a diagram illustrating an example of various communications between a scheduling entity and one or more subordinate entities according to aspects of the present disclosure.

FIG. 1 is a diagram 100 illustrating an example of various communications between a scheduling entity 102 and one or more subordinate entities 104 according to aspects of the present disclosure. Broadly, the scheduling entity 102 is a node or device responsible for scheduling traffic in a wireless communication network, including various downlink (DL) and uplink (UL) transmissions. The scheduling entity 102 may sometimes be referred to as a scheduler, and/or any other suitable term without deviating from the scope of the present disclosure. The scheduling entity 102 may be, or may reside within, a base station, a base transceiver station, a radio base station, a radio transceiver, a transceiver function, a basic service set, an extended service set, an access point, a Node B, a user equipment (UE), a mesh node, a relay, a peer, and/or any other suitable device.

Broadly, the subordinate entity 104 is a node or device that receives scheduling and/or control information, including but not limited to scheduling grants, synchronization or timing information, or other control information from another entity in the wireless communication network, such as the scheduling entity 102. The subordinate entity 104 may be referred to as a schedulee, and/or any other suitable term without deviating from the scope of the present disclosure. The subordinate entity 104 may be, or may reside within, a UE, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable computing device (e.g., a smart watch, glasses, a health or fitness tracker, etc.), an appliance, a sensor, a vending machine, and/or any other suitable device.

As used herein, 'control channel(s)' may sometimes be used to communicate grant information. The scheduling entity 102 may transmit DL data channel(s) 106 and DL control channel(s) 108. The subordinate entity 104 may transmit UL data channel(s) 110 and UL control channel(s) 112. The channels illustrated in FIG. 1 are not necessarily all of the channels that may be utilized by the scheduling entity 102 and/or the subordinate entity 104. Those of ordinary skill in the art will recognize that other channels may be utilized in addition to those illustrated, such as other data, control, and feedback channels. As used herein, the term 'downlink' or 'DL' may refer to a point-to-multipoint transmission originating at the scheduling entity 102, and the term 'uplink' or 'UL' may refer to a point-to-point transmission originating at the subordinate entity 104. According to aspects of the present disclosure, the term(s) 'communicate' and/or 'communicating' refer to transmission and/or reception. One of ordinary skill in the art will understand that many types of technologies may perform such communication without deviating from the scope of the present disclosure. As used herein, the term 'DL-centric time-division duplex (TDD) subframe' refers to a TDD subframe in which a substantial proportion (e.g., majority) of the information is communicated in the DL direction, even though some of the information may be communicated in the UL direction. Also, the term 'UL-centric TDD subframe' refers to a TDD subframe in which a substantial proportion (e.g., majority) of the information is communicated in the UL direction, even though some information may be communicated in the DL direction.

Various aspects of the present disclosure may refer to a 'subframe' (e.g., 'TDD subframe'). In some aspects, wireless communication may be performed utilizing a TDD carrier. The TDD carrier may include one or more TDD frames. Each TDD frame may include one or more TDD subframes. The duration of a TDD subframe may sometimes be referred to as a transmission time interval (TTI). In some aspects, a TDD subframe may be characterized as 'self-contained.' For example, a single TDD subframe may include scheduling information, data information corresponding to the scheduling information, and acknowledgment information corresponding to the data information. Information transmitted on a TDD carrier may be grouped into TDD subframes, where each TDD subframe provides communication in both directions (e.g., uplink from a subordinate entity 104 to a scheduling entity 102, and downlink from the scheduling entity 102 to the subordinate entity 104) in a suitable fashion to enable communication of a set of packets between the scheduling entity 102 and the subordinate entity 104.

Figure 2:
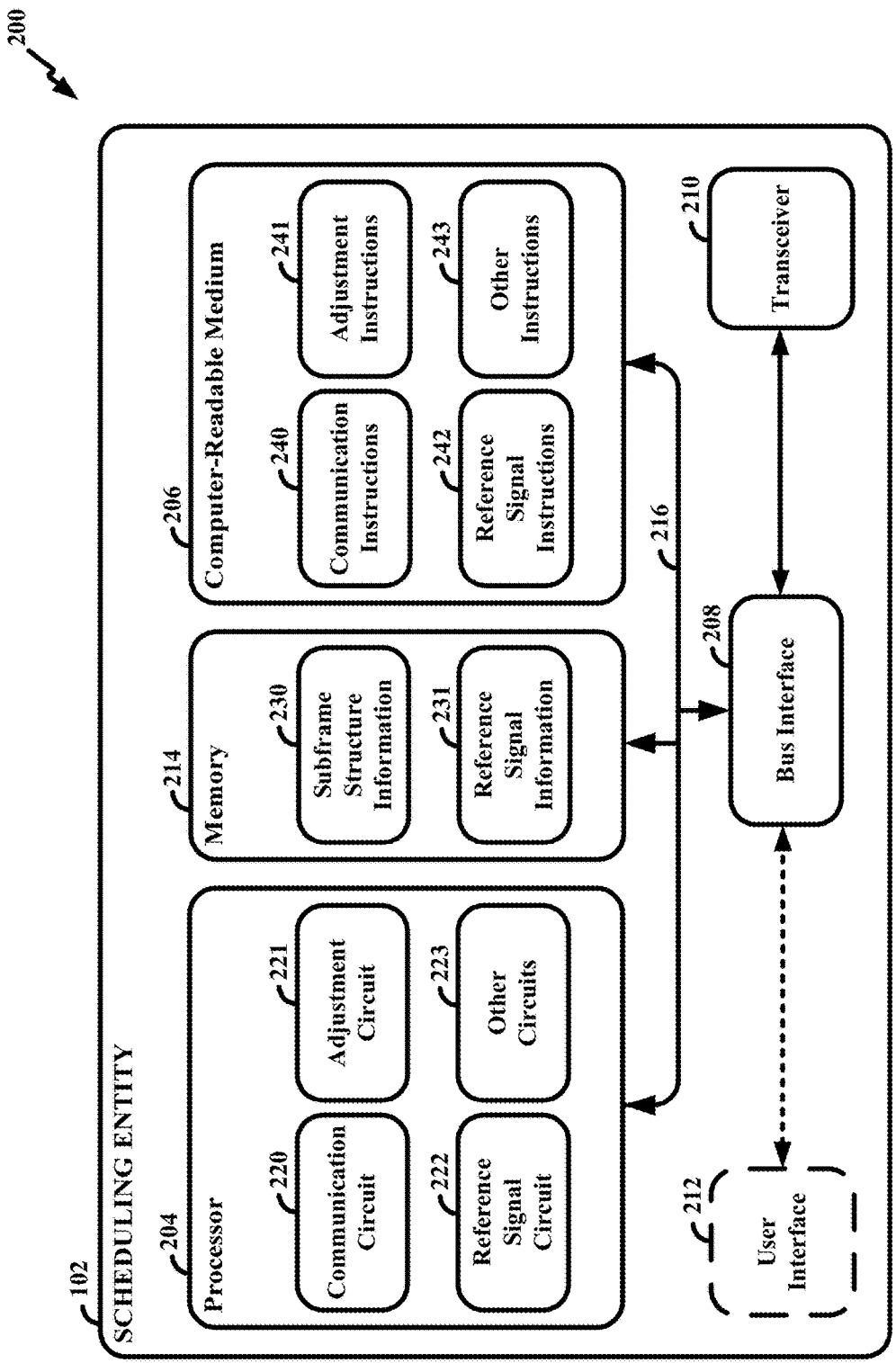
FIG. 2 is a diagram illustrating an example of a hardware implementation of a scheduling entity according to aspects of the present disclosure.

FIG. 2 is a diagram 200 illustrating an example of a hardware implementation of the scheduling entity 102 according to various aspects of the present disclosure. The scheduling entity 102 may include a user interface 212. The user interface 212 may be configured to receive one or more inputs from a user of the scheduling entity 102. In some configurations, the user interface 212 may be a keypad, a display, a speaker, a microphone, a joystick, and/or any other suitable component of the scheduling entity 102. The user interface 212 may exchange data via the bus interface 208. The scheduling entity 102 may also include a transceiver 210. The transceiver 210 may be configured to receive data and/or transmit data in communication with another apparatus. The transceiver 210 provides a means for communicating with another apparatus via a wired or wireless transmission medium. The transceiver 210 may be configured to perform such communications using various types of technologies without deviating from the scope of the present disclosure.

The scheduling entity 102 may also include a memory 214, one or more processors 204, a computer-readable medium 206, and a bus interface 208. The bus interface 208 may provide an interface between a bus 216 and the transceiver 210. The memory 214, the one or more processors 204, the computer-readable medium 206, and the bus interface 208 may be connected together via the bus 216. The processor 204 may be communicatively coupled to the transceiver 210 and/or the memory 214.

The processor 204 may include a communication circuit 220. In some configurations, the communication circuit 220 may include hardware components and/or may perform various algorithms that provide the means for utilizing the transceiver 210 to communicate one or more pilot or null tones in a data portion of a first TDD subframe, wherein the one or more pilot or null tones are used to capture interference from a second TDD subframe communicated by another apparatus. In some configurations, the communication circuit 220 may include hardware components and/or may perform various algorithms that provide the means for utilizing the transceiver 210 to receive signaling comprising information configured to indicate whether to adjust a communication of a reference signal (e.g., UE-specific reference signal (UERS)) in a DL-centric TDD subframe to a time that is aligned with a time at which another reference signal (e.g., demodulation reference signal (DMRS)) of an UL-centric TDD subframe is communicated by another apparatus.

In some configurations, the communication circuit 220 may include various hardware components and/or may perform various algorithms that provide the means for utilizing the transceiver 210 to receive signaling comprising information configured to indicate whether to adjust a structure of a TDD subframe. The processor 204 may also include an adjustment circuit 221. The adjustment circuit 221 may provide the means for adjusting the structure of the TDD subframe according to any one or more of the aspects described in greater detail herein. In some configurations, if the above-mentioned information indicates adjusting the structure of the TDD subframe, the adjustment circuit 221 may provide the means for adjusting the structure of the TDD subframe in response to receiving the signaling. The processor 204 may also include a reference signal circuit 222. The reference signal circuit 222 may include various hardware components and/or may perform various algorithms that provide the means for utilizing a reference signal (e.g., UERS) for inter-link multi-user multiple-input multiple-output (MU-MIMO) when the reference signal (e.g., UERS) is orthogonal to another reference signal (e.g., DMRS).

The foregoing description provides a non-limiting example of the processor 204 of the scheduling entity 102. Although various circuits 220, 221, 222 are described above, one of ordinary skill in the art will understand that the processor 204 may also include various other circuits 223 that are in addition and/or alternative(s) to the aforementioned circuits 220, 221, 222. Such other circuits 223 may provide the means for performing any one or more of the functions, methods, processes, features and/or aspects described herein.

The computer-readable medium 206 may include various computer-executable instructions. The computer-executable instructions may include computer-executable code configured to perform various functions and/or enable various aspects described herein. The computer-executable instructions may be executed by various hardware components (e.g., the processor 204 and/or any of its circuits 220, 221, 222, 223) of the scheduling entity 102. The computer-executable instructions may be a part of various software programs and/or software modules.

The computer-readable medium 206 may include communication instructions 240. In some configurations, the communication instructions 240 may include computer-executable instructions configured for communicating one or more pilot or null tones in a data portion of a first TDD subframe, wherein the one or more pilot or null tones are used to capture interference from a second TDD subframe communicated by another apparatus. In some configurations, the communication instructions 240 may include computer-executable instructions configured for receiving signaling comprising information configured to indicate whether to adjust a communication of a reference signal (e.g., UERS) in a DL-centric TDD subframe to a time that is aligned with a time at which another reference signal (e.g., DMRS) of an UL-centric TDD subframe is communicated by another apparatus.

In some configurations, the communication instructions 240 may include computer-executable instructions configured for receiving signaling comprising information configured to indicate whether to adjust a structure of a TDD subframe. The computer-readable medium 206 may include adjustment instructions 241. The adjustment instructions 241 may include computer-executable instructions configured for adjusting the structure of the TDD subframe according to any one or more of the aspects described in greater detail herein. In some configurations, if the above-mentioned information indicates adjusting the structure of the TDD subframe, the adjustment instructions 241 may include computer-executable instructions configured for adjusting the structure of the TDD subframe in response to receiving the signaling. The computer-readable medium 206 may also include reference signal instructions 242. In some configurations, the reference signal instructions 242 may include computer-executable instructions configured for utilizing a reference signal (e.g., UERS) for inter-link MU-MIMO when the reference signal (e.g., UERS) is orthogonal to another reference signal (e.g., DMRS).

The foregoing description provides a non-limiting example of the computer-readable medium 206 of the scheduling entity 102. Although various computer-executable instructions 240, 241, 242 are described above, one of ordinary skill in the art will understand that the computer-readable medium 206 may also include various other computer-executable instructions 243 that are in addition and/or alternative(s) to the aforementioned computer-executable instructions 240, 241, 242. Such other computer-executable instructions 243 may be configured for any one or more of the functions, methods, processes, features and/or aspects described herein.

The memory 214 may include various memory modules. The memory modules may be configured to store, and have read therefrom, various values and/or information by the processor 204, or any of its circuits 220, 221, 222, 223. The memory modules may also be configured to store, and have read therefrom, various values and/or information upon execution of the computer-executable code included in the computer-readable medium 206, or any of its instructions 240, 241, 242, 243. The memory 214 may include subframe structure information 230. The subframe structure information 230 may include various types, quantities, configurations, arrangements, and/or forms of information related to the structure of the TDD subframe according to one or more of the various aspects described in greater detail herein. In some examples, the subframe structure information 230 may be configured to adjust a time or subcarrier allocated for one or more control channels communicated in the TDD subframe. In some examples, the subframe structure information 230 may be configured to adjust a time or subcarrier allocated for data communicated in the TDD subframe. In some examples, the subframe structure information 230 may be configured to adjust a time or subcarrier allocated for one or more reference signals communicated in the TDD subframe.

The memory 214 may also include reference signal information 231. The reference signal information 231 may include various types, quantities, configurations, arrangements, and/or forms of information related to one or more reference signals described in greater detail herein. In some examples, such reference signal(s) may include one or more UERS(s). In some examples, such reference signal(s) may include one or more DMRS(s). For instance, in some configurations, reference signal information 231 may be utilized to adjust a time at which a UERS is communicated to be aligned with a time at which a DMRS of another TDD subframe is communicated by another apparatus. The foregoing description provides a non-limiting example of the memory 214 of the scheduling entity 102. Although various types of data of the memory 214 are described above, one of ordinary skill in the art will understand that the memory 214 may also include various other data that are in addition and/or alternative(s) to the aforementioned information 230, 231. Such other data may be associated with any one or more of the functions, methods, processes, features and/or aspects described herein.

One of ordinary skill in the art will also understand that the scheduling entity 102 may include alternative and/or additional features without deviating from the scope of the present disclosure. In accordance with various aspects of the present disclosure, an element, or any portion of an element, or any combination of elements may be implemented with a processing system that includes one or more processors 204. Examples of the one or more processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 216 and bus interface 208. The bus 216 may include any number of interconnecting buses and bridges depending on the specific application of the processing system and the overall design constraints. The bus 216 may link together various circuits including the one or more processors 204, the memory 214, and the computer-readable medium 206. The bus 216 may also link various other circuits such as timing sources, peripherals, voltage regulators, and power management circuits.

The one or more processors 204 may be responsible for managing the bus 216 and general processing, including the execution of software stored on the computer-readable medium 206. The software, when executed by the one or more processors 204, causes the processing system to perform the various functions described below for any one or more apparatuses. The computer-readable medium 206 may also be used for storing data that is manipulated by the one or more processors 204 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 206.

The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may also include, by way of example, a carrier wave, a transmission line, and any other suitable medium for transmitting software and/or instructions that may be accessed and read by a computer. The computer-readable medium 206 may reside in the processing system, external to the processing system, or distributed across multiple entities including the processing system. The computer-readable medium 206 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 3:
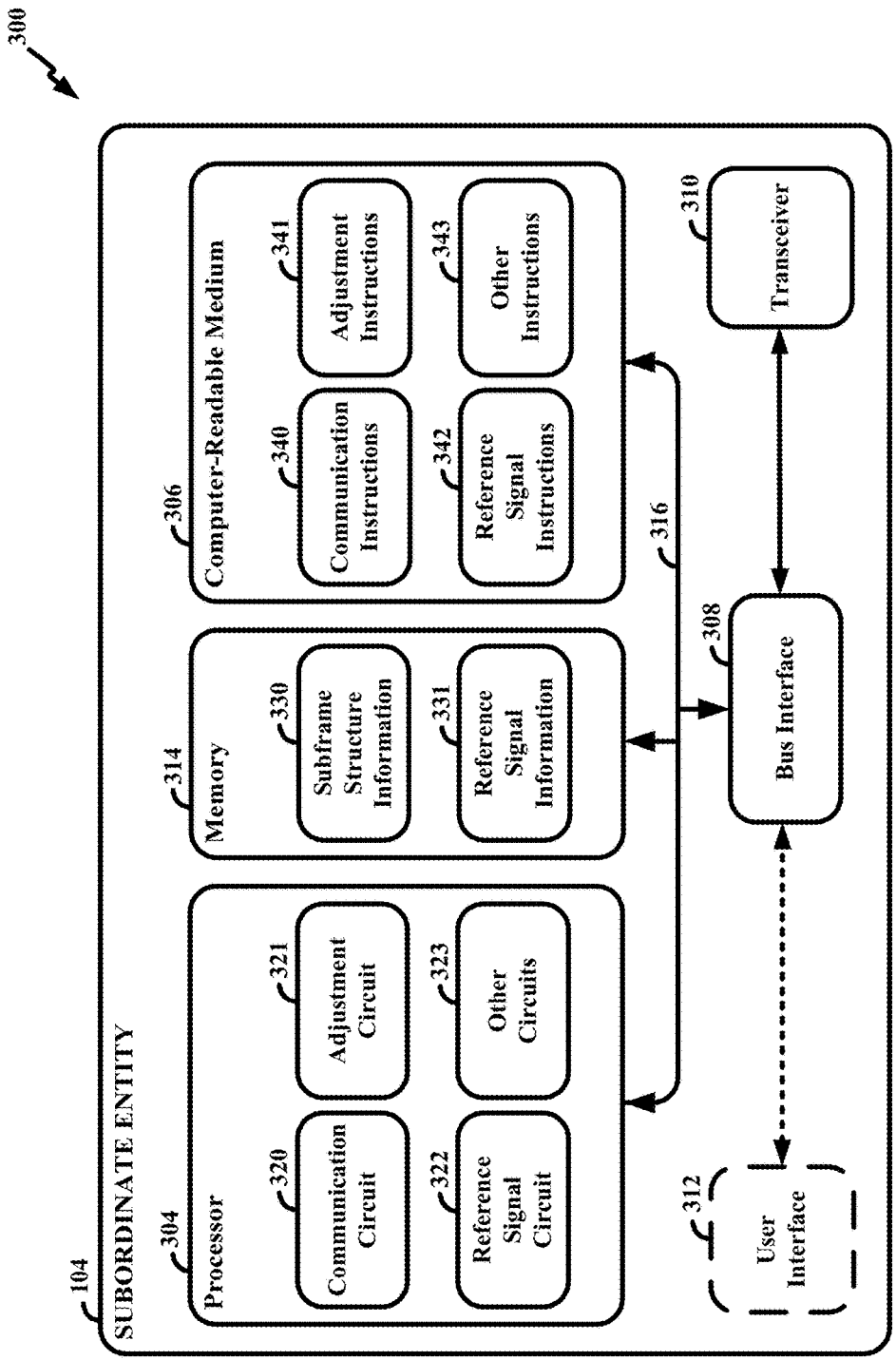
FIG. 3 is a diagram illustrating an example of a hardware implementation of the subordinate entity according to aspects of the present disclosure.

FIG. 3 is a diagram 300 illustrating an example of a hardware implementation of the subordinate entity 104 according to various aspects of the present disclosure. The subordinate entity 104 may include a user interface 312. The user interface 312 may be configured to receive one or more inputs from a user of the subordinate entity 104. In some configurations, the user interface 312 may be a keypad, a display, a speaker, a microphone, a joystick, and/or any other suitable component of the subordinate entity 104. The user interface 312 may exchange data via the bus interface 308. The subordinate entity 104 may also include a transceiver 310. The transceiver 310 may be configured to receive data and/or transmit data in communication with another apparatus. The transceiver 310 provides a means for communicating with another apparatus via a wired or wireless transmission medium. The transceiver 310 may be configured to perform such communications using various types of technologies without deviating from the scope of the present disclosure.

The subordinate entity 104 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The processor 304 may include a communication circuit 320. In some configurations, the communication circuit 320 may include hardware components and/or may perform various algorithms that provide the means for utilizing the transceiver 310 to communicate one or more pilot or null tones in a data portion of a first TDD subframe, wherein the one or more pilot or null tones are used to capture interference from a second TDD subframe communicated by another apparatus. In some configurations, the communication circuit 320 may include hardware components and/or may perform various algorithms that provide the means for utilizing the transceiver 310 to receive signaling comprising information configured to indicate whether to adjust a communication of a reference signal (e.g., UERS) in a DL-centric TDD subframe to a time that is aligned with a time at which another reference signal (e.g., DMRS) of an UL-centric TDD subframe is communicated by another apparatus.

In some configurations, the communication circuit 320 may include various hardware components and/or may perform various algorithms that provide the means for utilizing the transceiver 310 to receive signaling comprising information configured to indicate whether to adjust a structure of a TDD subframe. The processor 304 may also include an adjustment circuit 321. The adjustment circuit 321 may be configured to adjust the structure of the TDD subframe according to any one or more of the aspects described in greater detail herein. The processor 304 may also include a reference signal circuit 322. The reference signal circuit 322 may include various hardware components and/or may perform various algorithms that provide the means for utilizing a reference signal (e.g., UERS) for inter-link MU-MIMO when the reference signal (e.g., UERS) is orthogonal to another reference signal (e.g., DMRS).

The foregoing description provides a non-limiting example of the processor 304 of the subordinate entity 104. Although various circuits 320, 321, 322 are described above, one of ordinary skill in the art will understand that the processor 304 may also include various other circuits 323 that are in addition and/or alternative(s) to the aforementioned circuits 320, 321, 322. Such other circuits 323 may provide the means for performing any one or more of the functions, methods, processes, features and/or aspects described herein.

The computer-readable medium 306 may include various computer-executable instructions. The computer-executable instructions may include computer-executable code configured to perform various functions and/or enable various aspects described herein. The computer-executable instructions may be executed by various hardware components (e.g., the processor 304 and/or any of its circuits 320, 321, 322, 323) of the subordinate entity 104. The computer-executable instructions may be a part of various software programs and/or software modules.

The computer-readable medium 306 may include communication instructions 340. In some configurations, the communication instructions 340 may include computer-executable instructions configured for communicating one or more pilot or null tones in a data portion of a first TDD subframe, wherein the one or more pilot or null tones are used to capture interference from a second TDD subframe communicated by another apparatus. In some configurations, the communication instructions 340 may include computer-executable instructions configured for receiving signaling comprising information configured to indicate whether to adjust a communication of a reference signal (e.g., UERS) in a DL-centric TDD subframe to a time that is aligned with a time at which another reference signal (e.g., DMRS) of an UL-centric TDD subframe is communicated by another apparatus.

In some configurations, the communication instructions 340 may include computer-executable instructions configured for receiving signaling comprising information configured to indicate whether to adjust a structure of a TDD subframe. The computer-readable medium 306 may include adjustment instructions 341. In some configurations, the adjustment instructions 341 may also include computer-executable instructions configured for adjusting the structure of the TDD subframe according to any one or more of the aspects described in greater detail herein. The computer-readable medium 306 may also include reference signal instructions 342. In some configurations, the reference signal instructions 342 may include computer-executable instructions configured for utilizing a reference signal (e.g., UERS) for inter-link MU-MIMO when the reference signal (e.g., UERS) is orthogonal to another reference signal (e.g., DMRS).

The foregoing description provides a non-limiting example of the computer-readable medium 306 of the subordinate entity 104. Although various computer-executable instructions 340, 341, 342 are described above, one of ordinary skill in the art will understand that the computer-readable medium 306 may also include various other computer-executable instructions 343 that are in addition and/or alternative(s) to the aforementioned computer-executable instructions 340, 341, 342. Such other computer-executable instructions 343 may be configured for any one or more of the functions, methods, processes, features and/or aspects described herein.

The memory 314 may include various memory modules. The memory modules may be configured to store, and have read therefrom, various values and/or information by the processor 304, or any of its circuits 320, 321, 322, 323. The memory modules may also be configured to store, and have read therefrom, various values and/or information upon execution of the computer-executable code included in the computer-readable medium 306, or any of its instructions 340, 341, 342, 343. The memory 314 may include subframe structure information 330. The subframe structure information 330 may include various types, quantities, configurations, arrangements, and/or forms of information related to the structure of the TDD subframe according to one or more of the various aspects described in greater detail herein. In some examples, the subframe structure information 330 may be configured to adjust a time or subcarrier allocated for one or more control channels communicated in the TDD subframe. In some examples, the subframe structure information 330 may be configured to adjust a time or subcarrier allocated for data communicated in the TDD subframe. In some examples, the subframe structure information 330 may be configured to adjust a time or subcarrier allocated for one or more reference signals communicated in the TDD subframe.

The memory 314 may also include reference signal information 331. The reference signal information 331 may include various types, quantities, configurations, arrangements, and/or forms of information related to one or more reference signals described in greater detail herein. In some examples, such reference signal(s) may include one or more UERS(s). In some examples, such reference signal(s) may include one or more DMRS(s). For instance, in some configurations, reference signal information 331 may be utilized to adjust a time at which a UERS is communicated to be aligned with a time at which a DMRS of another TDD subframe is communicated by another apparatus. The foregoing description provides a non-limiting example of the memory 314 of the subordinate entity 104. Although various types of data of the memory 314 are described above, one of ordinary skill in the art will understand that the memory 314 may also include various other data that are in addition and/or alternative(s) to the aforementioned information 330, 331. Such other data may be associated with any one or more of the functions, methods, processes, features and/or aspects described herein.

One of ordinary skill in the art will also understand that the subordinate entity 104 may include alternative and/or additional features without deviating from the scope of the present disclosure. In accordance with various aspects of the present disclosure, an element, or any portion of an element, or any combination of elements may be implemented with a processing system that includes one or more processors 304. Examples of the one or more processors 304 include microprocessors, microcontrollers, DSPs, FPGAs, PLDs, state machines, gated logic, discrete hardware circuits, and other suitable hardware configured to perform the various functionality described throughout this disclosure. The processing system may be implemented with a bus architecture, represented generally by the bus 316 and bus interface 308. The bus 316 may include any number of interconnecting buses and bridges depending on the specific application of the processing system and the overall design constraints. The bus 316 may link together various circuits including the one or more processors 304, the memory 314, and the computer-readable medium 306. The bus 316 may also link various other circuits such as timing sources, peripherals, voltage regulators, and power management circuits.

The one or more processors 304 may be responsible for managing the bus 316 and general processing, including the execution of software stored on the computer-readable medium 306. The software, when executed by the one or more processors 304, causes the processing system to perform the various functions described below for any one or more apparatuses. The computer-readable medium 306 may also be used for storing data that is manipulated by the one or more processors 304 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 306 may also include, by way of example, a carrier wave, a transmission line, and any other suitable medium for transmitting software and/or instructions that may be accessed and read by a computer. The computer-readable medium 306 may reside in the processing system, external to the processing system, or distributed across multiple entities including the processing system. The computer-readable medium 306 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 4:
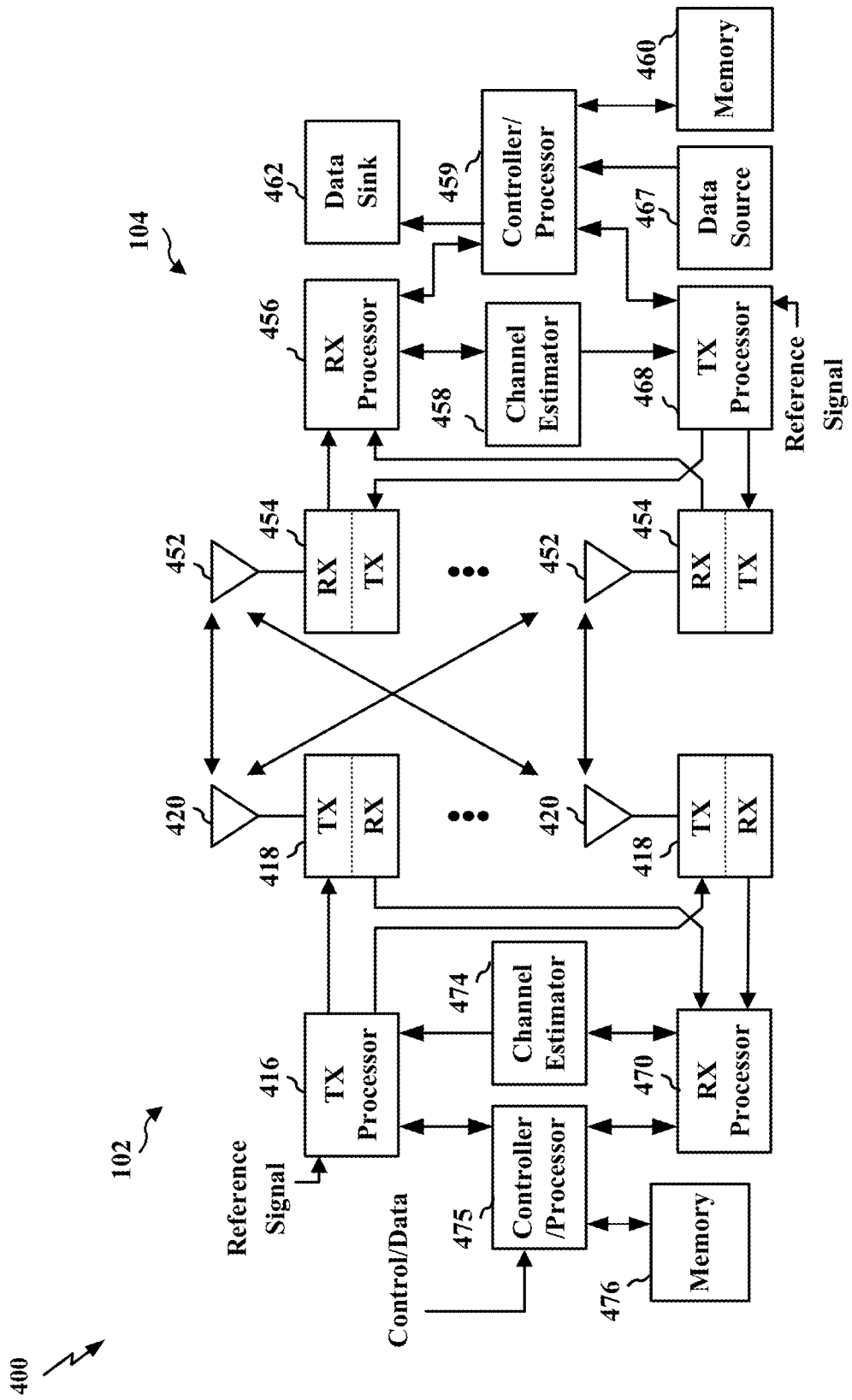
FIG. 4 is a diagram illustrating an example of a scheduling entity in communication with a subordinate entity in an access network according to aspects of the present disclosure.

FIG. 4 is a diagram 400 of the scheduling entity 102 in communication with the subordinate entity 104 in an access network according to aspects of the present disclosure. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the subordinate entity 104 based on various priority metrics. The controller/processor 475 is also responsible for HARQ operations, retransmission of lost packets, and signaling to the subordinate entity 104.

The transmit (TX) processor 416 implements various signal processing functions for the L1 layer (i.e., physical layer). The signal processing functions include coding and interleaving to facilitate forward error correction (FEC) at the subordinate entity 104 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the subordinate entity 104. Each spatial stream may then be provided to a different antenna 420 via a separate transmitter 418TX. Each transmitter 418TX may modulate an RF carrier with a respective spatial stream for transmission.

At the subordinate entity 104, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 may perform spatial processing on the information to recover any spatial streams destined for the subordinate entity 104. If multiple spatial streams are destined for the subordinate entity 104, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the scheduling entity 102. These soft decisions may be based on channel estimates computed by the channel estimator 458. The soft decisions are then decoded and deinterleaved to recover the data and control signals that were originally transmitted by the scheduling entity 102 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the scheduling entity 102, the controller/processor 459 implements the L2 layer for the user plane and the control plane by providing header compression, ciphering, packet segmentation and reordering, and multiplexing between logical and transport channels based on radio resource allocations by the scheduling entity 102. The controller/processor 459 is also responsible for HARQ operations, retransmission of lost packets, and signaling to the scheduling entity 102.

Channel estimates derived by a channel estimator 458 from a reference signal or feedback transmitted by the scheduling entity 102 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the scheduling entity 102 in a manner similar to that described in connection with the receiver function at the subordinate entity 104. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the subordinate entity 104. Upper layer packets from the controller/processor 475 may be provided to the core network. The controller/processor 475 is also responsible for error detection using an ACK and/or NACK protocol to support HARQ operations.

Figure 5:
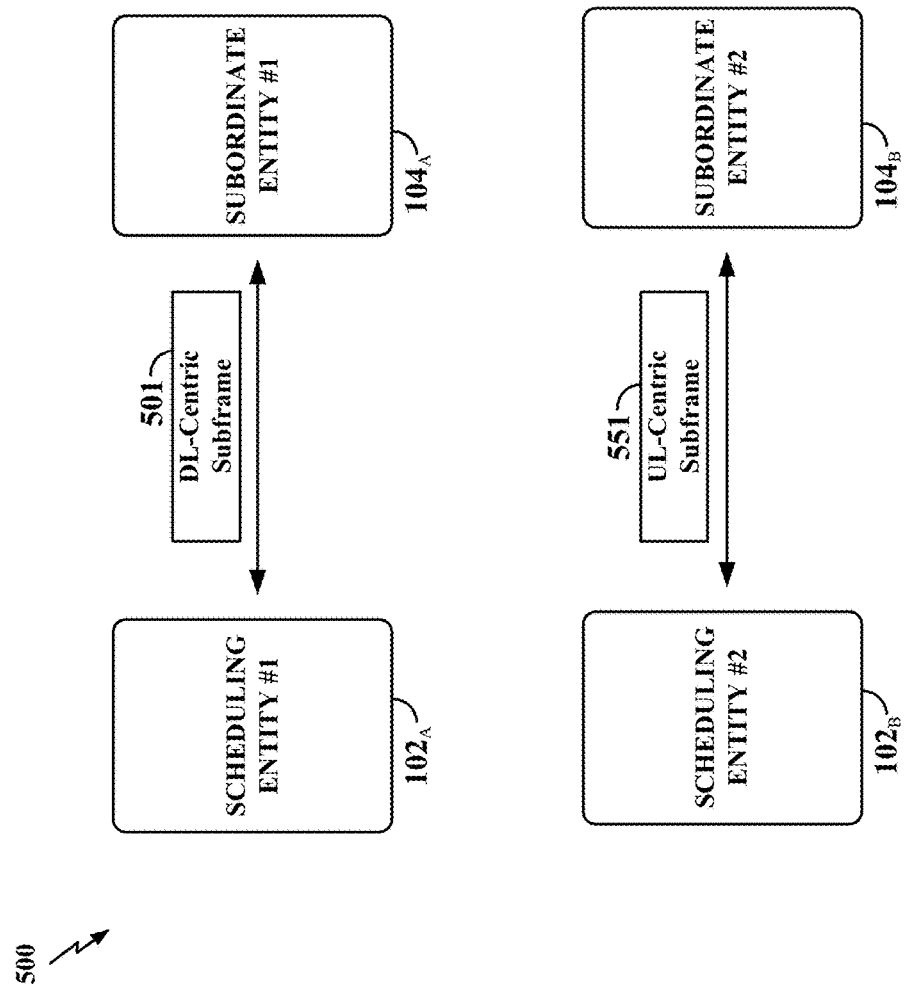
FIG. 5 is a diagram illustrating an example of a concurrent communication of an uplink (UL)-centric time-division duplex (TDD) subframe and a downlink (DL)-centric TDD subframe according to aspects of the present disclosure.

FIG. 5 is a diagram 500 illustrating an example of a concurrent communication of a DL-centric TDD subframe 501 and an UL-centric TDD subframe 551. In the example illustrated in FIG. 5, the DL-centric TDD subframe 501 is communicated between a first scheduling entity $102_A$ (Scheduling Entity #1) and a first subordinate entity $104_A$ (Subordinate Entity #1), and the UL-centric TDD subframe 551 is communicated between a second subordinate entity $104_B$ (Subordinate Entity #2) and a second scheduling entity $102_B$ (Scheduling Entity #2). In some examples, these subframes may each include 16 symbols. When the coverage areas of these transmissions overlap with each other, these two subframes may interfere with each other. In other words, the transmission of one of the subframes may interfere with the transmission of the other subframe. For example, the UL-centric TDD subframe 551 may interfere with the DL-centric TDD subframe 501.

One of ordinary skill in the art will understand that the concept of 'interference' (e.g., between two transmission) may also relate to the concept of 'collisions' (e.g., between those two transmissions) without deviating from the scope of the present disclosure. The entities illustrated in FIG. 5 may sometimes transmit reference signals. In some examples, such reference signals may assist with decoding and/or demodulation of received information. In some examples, such reference signals may capture interference from other transmissions. For example, the first scheduling entity $102_A$ (Scheduling Entity #1) may transmit a DL reference signal in the DL-centric TDD subframe 501. The concurrently-communicated UL-centric TDD subframe 551 may interfere with that DL reference signal. Any interference by the concurrently-communicated UL-centric TDD subframe 551 may be captured in that DL reference signal. The first subordinate entity $104_A$ (Subordinate Entity #1) may receive that DL reference signal and perform interference measurements by analyzing any interference captured in that DL reference signal. However, when these reference signals do not accurately capture the interference from other transmissions, those entities may not be able to communicate as efficiently as otherwise possible, as described in greater detail below with reference to FIG. 6.

Figure 6:
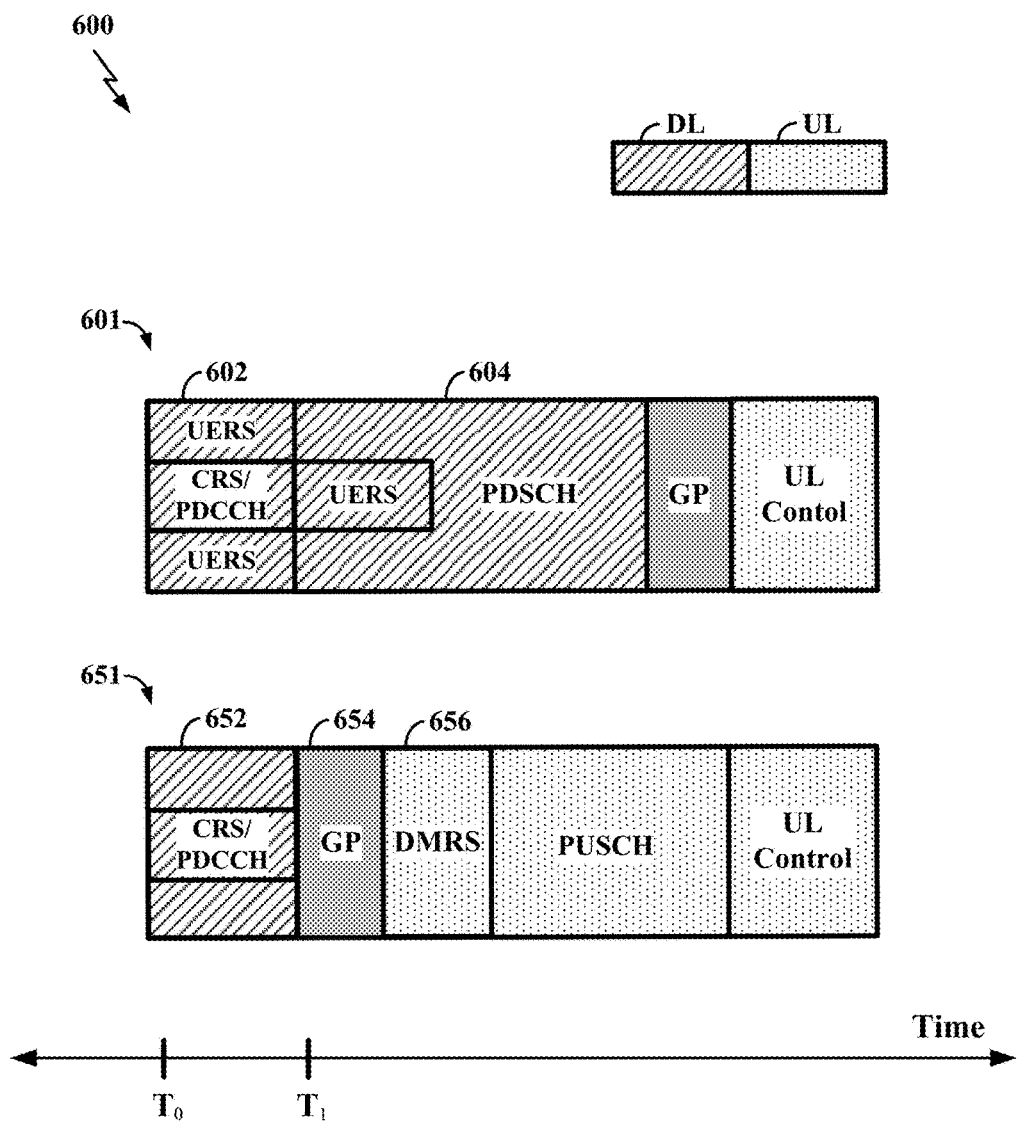
FIG. 6 is a diagram illustrating an example of an UL-centric TDD subframe and a DL-centric TDD subframe according to some existing configurations.

FIG. 6 is a diagram 600 illustrating an example of a DL-centric TDD subframe 601 and an UL-centric TDD subframe 651 according to some existing configurations. As discussed in greater detail above with reference to FIG. 5, these communications may be concurrent and within the coverage area of each other, thereby leading to the possibility of one communication interfering with the other communication. In existing configurations, the DL-centric TDD subframe 601 may include a first portion 602 that includes a UE-specific reference signal (UERS), a cell-specific reference signal (CRS), and/or physical channel control channel (PDCCH). Generally, the CRS and/or PDCCH include control information, as described in greater detail herein. In the example illustrated in FIG. 6, the CRS and/or PDCCH are included at or near the center of the bandwidth allocated for the first portion 602 of the DL-centric TDD subframe 601. Generally, the UERS is a reference signal that is used to capture interference from other communications. For example, the UERS may be utilized by an apparatus to capture any interference that may be caused by the UL-centric TDD subframe 651. In the example illustrated in FIG. 6, the UERS is included away from the center of the bandwidth allocated for the first portion 602 of the DL-centric TDD subframe 601.

In some configurations, the UERS may be communicated at time $T_0$. However, at time $T_0$, the UL-centric TDD subframe 651 may not include dedicated communications at every frequency in the allocated bandwidth. For example, FIG. 6 illustrates no dedicated channels for the regions positioned away from the center frequency of the first portion 652 of the UL-centric TDD subframe 651. Because there may sometimes be no dedicated communication in those regions of the first portion 652 of the UL-centric TDD subframe 651, the UERS communicated during the first portion 602 of the DL-centric TDD subframe 601 may not accurately capture interference from the UL-centric TDD subframe 651. In other words, at time $T_0$, the UERS communicated in the first portion 602 of the DL-centric TDD subframe 601 may not accurately capture interference from the first portion 652 of the UL-centric TDD subframe 651.

In some configurations, the UERS may be communicated at time $T_1$. At time $T_1$, the UERS may be communicated during a data portion (e.g., portion 604) of the DL-centric TDD subframe 601, as illustrated in FIG. 6. The UERS may be communicated on some subcarriers at a time (e.g., time $T_1$) at which some other subcarriers are utilized for PDSCH. However, at time $T_1$, the UL-centric TDD subframe 651 has a guard period (GP) 654, as illustrated in FIG. 6. Generally, the GP 654 is a period of time wherein communication is not performed. The GP 654 may be utilized to ensure that distinct transmission do not interfere with each other. Such interference may be caused by propagation delays, echoes, reflections, and/or various other factors. Referring to the example illustrated in FIG. 6, the GP 654 may be utilized to ensure that transmissions from the first portion 652 of the UL-centric TDD subframe 651 do not interfere with the portion 656 following the GP 654. One of ordinary skill in the art will understand that a GP may also be referred to as a guard interval, inter-frame spacing, and various other terms without deviating from the scope of the present disclosure.

Because the UERS is communicated in the DL-centric TDD subframe 601 at a time (e.g., time $T_1$) that is concurrent with the GP 654, the UERS may not accurately capture the interference from the concurrently-communicated UL-centric TDD subframe 651. In other words, at time $T_1$, at least a portion of the UERS overlaps with the GP 654, which may be a period of non-communication in the concurrently-communicated UL-centric TDD subframe 651. Consequently, the UERS may not necessarily capture interference from the concurrently-communicated UL-centric TDD subframe 651 during the period of time that the UERS overlaps with the GP 654. In other words, at time $T_1$, the UERS communicated in the second portion 604 of the DL-centric TDD subframe 601 may not accurately capture interference from the UL-centric TDD subframe 651 (because the UL-centric TDD subframe 651 is 'silent' during the GP 654, thereby preventing the reference signal from accurately capturing any interference that may be caused by the UL-centric TDD subframe 651).

The examples provided above describe some circumstances in which the UERS may not accurately capture interference from the UL-centric TDD subframe 651. Inaccurate information about interference from concurrent communications may adversely affect the covariance matrix ($R_{nn}$) utilized by the apparatus for interference measurement, interference attenuation, and/or nulling gain. Generally, the apparatus may estimate using various reference signals (e.g., UERS). The apparatus may try to estimate to be as close as possible to the experienced by the information or data being communicated. Accordingly, the accuracy of the estimated $R_{nn}$ may be relatively high when the reference signals (e.g., UERS) accurately capture the true interference from other concurrent communications. Without accurate information about interference from other concurrent communications, an apparatus may not be able to communicate as efficiently and effectively as it would be able to otherwise. Accordingly, existing configurations of the DL-centric TDD subframe 601 and the UL-centric TDD subframe 651 may benefit from enhancements that enable improved interference capture.

Figure 7:
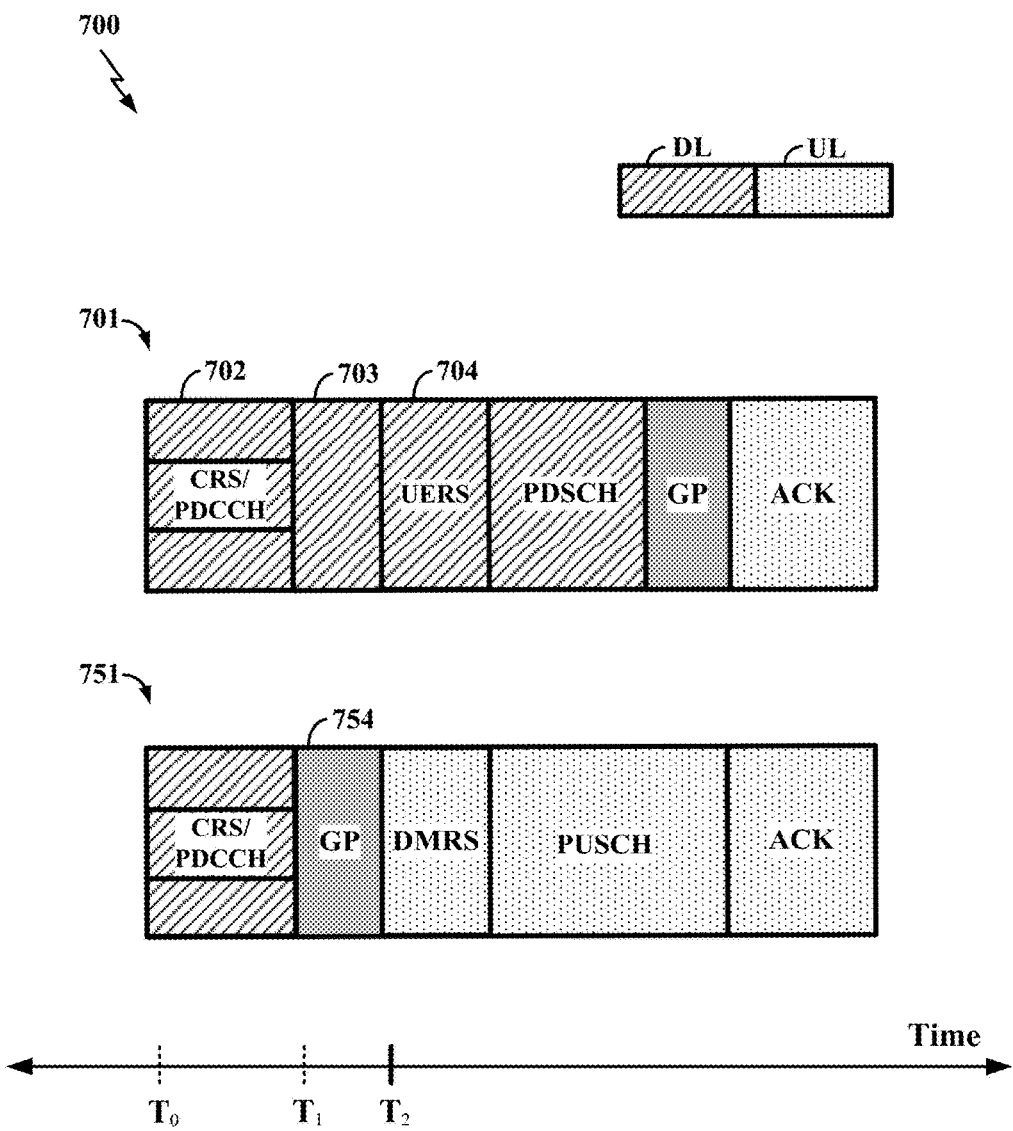
FIG. 7 is a diagram illustrating an example of an UL-centric TDD subframe and a DL-centric TDD subframe according to aspects of the present disclosure.

FIG. 7 is a diagram 700 illustrating an example of a DL-centric TDD subframe 701 and an UL-centric TDD subframe 751 according to aspects of the present disclosure. As shown in the example illustrated in FIG. 7, the UERS may be communicated during a portion 704 of the DL-centric TDD subframe 701 that is outside of the GP 754 of the UL-centric TDD subframe 751. In some examples, the UERS may be communicated during a portion 704 of the DL-centric TDD subframe 701 that is aligned with a particular reference signal of the UL-centric TDD subframe 751. More specifically, in some examples, this particular reference signal may be a DMRS. Generally, the DMRS is a reference signal that may be utilized in the UL-centric TDD subframe 751 to capture interference from other communications. Accordingly, instead of communicating the UERS at time $T_1$, as may be performed in certain existing systems, the UERS may be communicated at a subsequent time $T_2$, which is aligned with the DMRS of the UL-centric TDD subframe 751, as illustrated in FIG. 7. As such, the UERS can capture interference from the UL-centric TDD subframe 751 in a manner that is more accurate than the manner that interference is captured using the UERS in existing configurations (as described above with reference to FIG. 6).

The example illustrated in FIG. 7 shows that the UERS is aligned with the DMRS, and that the DMRS is positioned at a beginning portion of the physical uplink shared channel (PUSCH). Aligning the UERS with the DMRS relatively early in the respective TDD subframes may speed up processing and enhance interference capture relative to aligning the UERS and the DMRS relatively later in the respective TDD subframes. Nevertheless, one of ordinary skill in the art will understand that the example configuration illustrated in FIG. 7 is provided for discussion purposes and various alternative alignments exist and are within the scope of the present disclosure. For example, the aligned UERS and DMRS may be shifted towards a relatively later position of the respective TDD subframes without deviating from the scope of the present disclosure. In addition to enhancing interference capture by aligning the UERS and DMRS, the aligned UERS and DMRS may enable inter-link multi-user multiple-input multiple-output (MU-MIMO) when the UERS is orthogonal to the DMRS. Inter-link MU-MIMO may be enabled by assigning orthogonal ports to the DL reference signal (e.g., UERS) and UL reference signal (e.g., DMRS). Inter-link MU-MIMO may be achieved by using a virtual cell identifier (ID). Although inter-link MU-MIMO may be enabled by the orthogonal configuration that may exist in subframes illustrated in FIG. 7, inter-link MU-MIMO may not be enabled in the subframes illustrated in FIG. 6. In the subframes illustrated in FIG. 6, the UERS and DMRS are not time-aligned and may not be assigned orthogonal ports.

Although the example illustrated in FIG. 7 illustrates the UERS utilizing all of the tones in the frequency domain, one of ordinary skill in the art will understand that the UERS may utilize fewer than all of the tones in the frequency domain without deviating from the scope of the present disclosure. In other words, the UERS may be communicated using no more than a subset of the tones of the frequency domain. One of ordinary skill in the art will also understand that the portion 703 immediately preceding the portion allocated for the UERS may include various types of information without deviating from the scope of the present disclosure. For example, such a portion 703 may include control information, data (e.g., as an additional portion of the PDSCH), and/or various other suitable information. One of ordinary skill in the art will also understand that such a portion 703 may also be unused (e.g., no useful information provided therein) without deviating from the scope of the present disclosure.

An apparatus may dynamically determine which of the subframe structures (described herein) will be utilized from time to time. In other words, an apparatus may be configured to determine whether to utilize the structure of the DL-centric TDD subframe 601 illustrated in FIG. 6 or the structure of the DL-centric TDD subframe 701 illustrated in FIG. 7 based on one or more criteria. An example of a criterion may be quality of service (QoS) information associated with the DL-centric TDD subframe 601, 701. For instance, the QoS information associated with the DL-centric TDD subframe 601, 701 may indicate that the DL-centric TDD subframe 601, 701 contains mission critical (MiCr) data. MiCr data may refer to data that has a relatively low latency requirement associated with it. MiCr data may also have relatively high importance for the apparatus to which it is intended/destined. In some examples, the apparatus may determine to utilize the structure of the example of the DL-centric TDD subframe 601 illustrated in FIG. 6 when the QoS information indicates that the DL-centric TDD subframe 601 includes MiCr data. In some examples, the apparatus may determine to utilize the structure of the example of the DL-centric TDD subframe 701 illustrated in FIG. 7 when the QoS information indicates that the DL-centric TDD subframe 601 includes non-MiCr data. These examples, however, can vary based on the specific implementation and, accordingly, other examples are within the scope of the present disclosure.

Another example of a criterion may be certain control information received by that apparatus. For example, the apparatus may be configured to determine whether to utilize the structure of the DL-centric TDD subframe 601 illustrated in FIG. 6 or the structure of the DL-centric TDD subframe 701 illustrated in FIG. 7 based on such control information. Such control information may indicate whether the apparatus should dynamically adjust the communication of the UERS in the DL-centric TDD subframe 601, 701 from the structure described with reference to FIG. 6 to the structure described with reference to FIG. 7. Accordingly, the apparatus may determine whether to dynamically adjust the communication of the UERS in the DL-centric TDD subframe 601, 701 to the time (e.g., from time $T_1$ to time $T_2$) that follows the GP 654, 754 of another concurrent communication.

One of ordinary skill in the art will understand that such control information may be provided to the apparatus in many forms, types, structures, and/or configurations without deviating from the scope of the present disclosure. In some examples, such control information is received prior to the communication of the UERS. In some examples, such control information may be included in the first portion 602, 702 (e.g., the CRS, the PDCCH, and/or other channels in that portion 602, 702) of the DL-centric TDD subframe 601, 701. In some examples, such information may be provided to the apparatus via a broadcast message from the network (e.g., eNBs, scheduling entities, etc.). In some examples, such control information may be provided via a backhaul. In some examples, such control information may be provided to the apparatus from a subframe that precedes the current TDD subframe. In some examples, such control information may be provided per transmission time interval. In some examples, such control information may be provided on a semi-static scale based on radio resource control signaling. In some examples, such control information may be provided via Layer 1 signaling. Additional and alternative techniques for providing such control information exist and are within the scope of the present disclosure.

Figure 8:
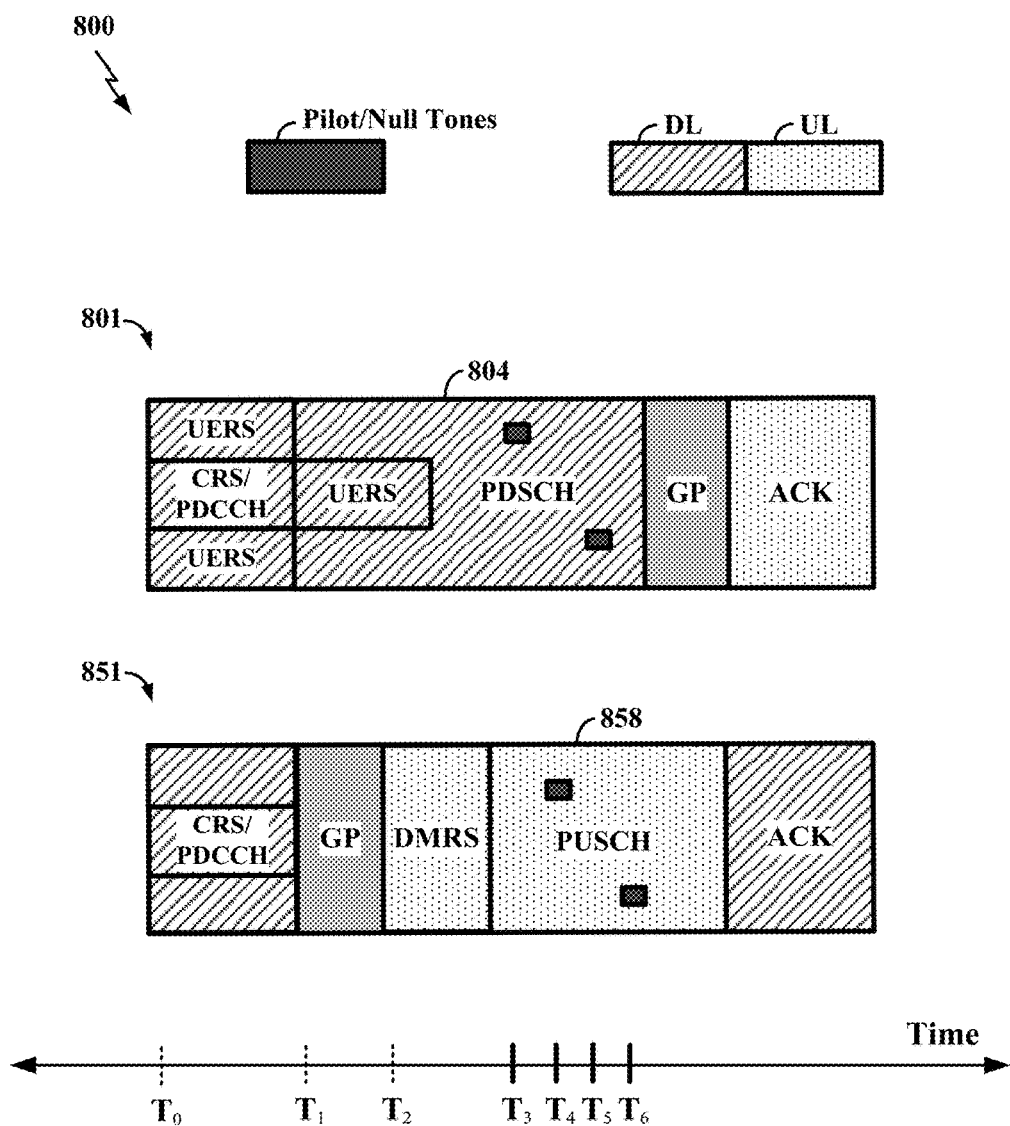
FIG. 8 is a diagram illustrating another example of an UL-centric TDD subframe and a DL-centric TDD subframe according to aspects of the present disclosure.

FIG. 8 is a diagram 800 illustrating another example of a DL-centric TDD subframe 801 and an UL-centric TDD subframe 851 according to aspects of the present disclosure. In the example illustrated in FIG. 8, one or more pilot or null tones are communicated in a data portion of the TDD subframe. With reference to the DL-centric TDD subframe 801, the one or more pilot or null tones may be communicated in the portion 804 that includes the PDSCH. With reference to the UL-centric TDD subframe 851, one or more pilot or null tones may be communicated in the portion 858 that includes the PUSCH. For illustrative purposes, FIG. 8 shows that one or more pilot or null tones are communicated in the DL-centric TDD subframe 801 at times $T_3$, $T_5$, and one or more pilot or null tones are communicated in the UL-centric TDD subframe 851 at times $T_4$, $T_6$.

Generally, pilot or null tones may be used to capture interference from another TDD subframe concurrently communicated by another apparatus. These TDD subframes may at least partially align temporally, at least partially overlap temporally, and/or at least partially occur concurrently relative to each other. As an example, the pilot or null tone communicated in the DL-centric TDD subframe 801 at time $T_3$ may capture any interference from the concurrently-communicated portion 858 (having the PUSCH) of the UL-centric TDD subframe 851. As another example, the pilot or null tone communicated in the UL-centric TDD subframe 851 at time $T_4$ may capture any interference from the concurrently-communicated portion 804 (having the PDSCH) of the DL-centric TDD subframe 801. Any interference captured by these pilot or null tones may be utilized to estimate $R_{nn}$, which is described in greater detail above.

Although the example illustrated in FIG. 8 shows the pilot or null tones being communicated in the PUSCH and/or PDSCH, one of ordinary skill in the art will understand that such pilot or null tones may also be communicated in any other portions of the TDD subframes without deviating from the scope of the present disclosure. Although the example illustrated in FIG. 8 shows two pilot or null tones in each of the TDD subframes, one of ordinary skill in the art will understand that any positive number of pilot or null tones may be included in the respective TDD subframes without deviating from the scope of the present disclosure. One of ordinary skill in the art will also understand that a greater number of pilot or null tones may provide relatively more accurate interference information in some circumstances.

It is also possible for the pilot tones in the respective TDD subframes to be time-align with data (e.g., non-pilot tones, non-null tones) of another subframe. For example, at times $T_3$, $T_5$, pilot tones in the DL-centric TDD subframe may align with data included in the PUSCH, and, at times $T_4$, $T_6$, pilot tones in the UL-centric TDD subframe 851 may align with data included in the PDSCH. One of ordinary skill in the art will also understand that it may not be ideal for the null tones in the TDD subframes 801, 851 to time-align with each other (because interference will not be accurately detected when both subframes are 'silent'). However, it may be possible for pilot tones in the TDD subframe 801, 851 to time-align with each other (because those pilot tones may capture the presence of each other).

Although the example illustrated in FIG. 8 shows one or more pilot or null tones included in subframe structures that have some similarities with the subframe structures illustrated in FIG. 6, one of ordinary skill in the art will understand that the one or more of these pilot or null tones may alternatively be included subframe structures that have some similarities with the subframe structures illustrated in FIG. 7 without deviating from the scope of the present disclosure. In other words, one or more pilot tones may be included in the manner illustrated in FIG. 8, even when the UERS is time-aligned with the DMRS, as illustrated and described above with reference to FIG. 7.

Figure 9:
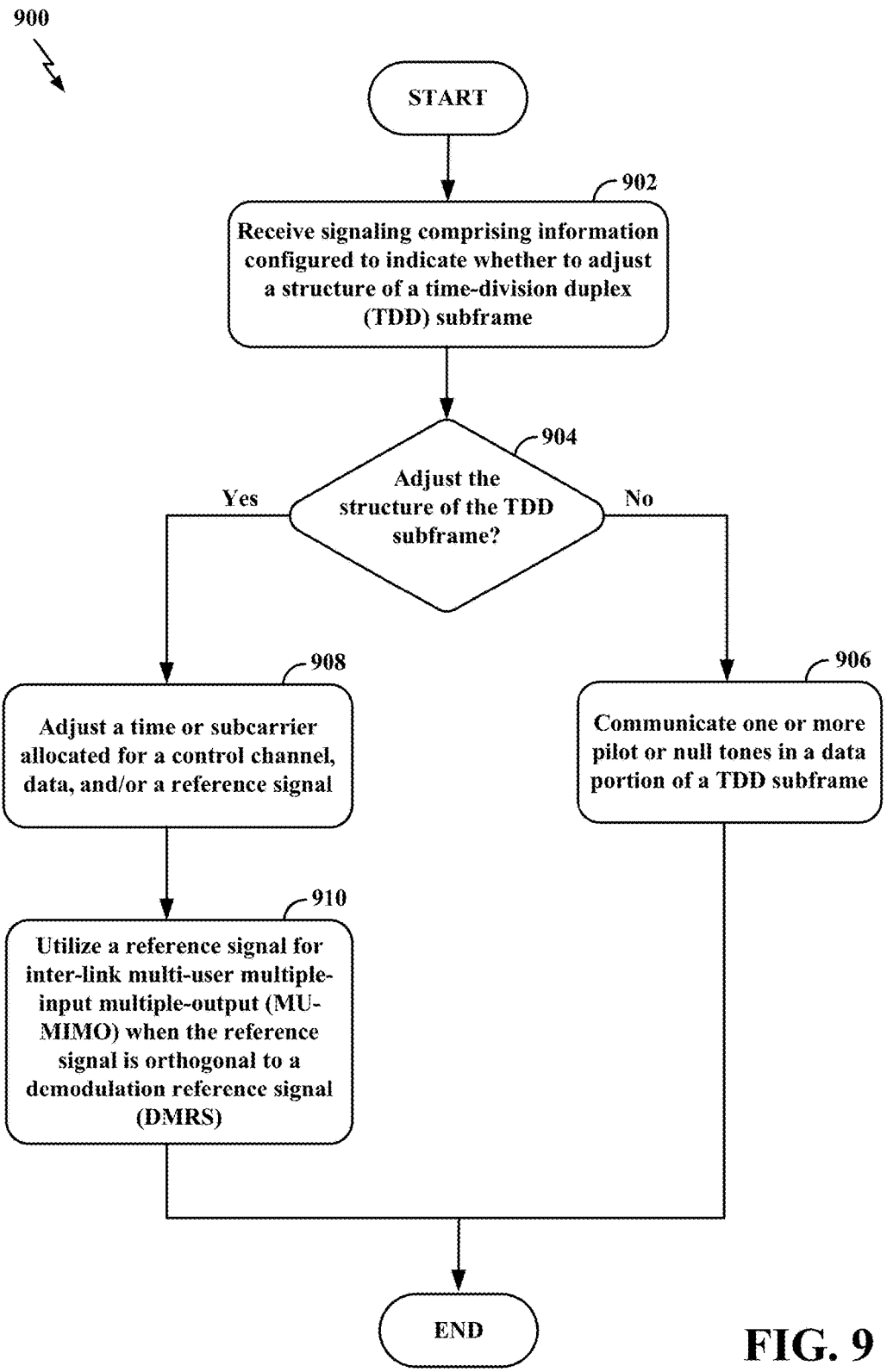
FIG. 9 is a diagram illustrating an example of various methods and/or processes according to aspects of the present disclosure.

FIG. 9 is a diagram 900 illustrating an example of various processes and/or methods in accordance with aspects of the present disclosure. Any one or more of these processes and/or methods may be performed by any apparatus described herein. At block 902, the apparatus may receive signaling comprising information configured to indicate whether to adjust a structure of a TDD subframe. In some examples, such information may include control information. In some examples, such information may correspond to QoS.

At block 904, the apparatus may determine whether to adjust the structure of the TDD subframe. For example, based on the received signaling, the apparatus may determine whether to adjust a time or subcarrier allocated for a control channel, data, and/or a reference signal, such as a UERS.

On the one hand, if the apparatus determines to refrain from adjusting the structure of the TDD subframe, at block 906, the apparatus may communicate one or more pilot or null tones in a data portion of a first TDD subframe. The one or more pilot or null tones may be used to capture interference from a second TDD subframe communicated by another apparatus. For example, referring to FIG. 8, one or more pilot or null tones may be communicated in the DL-centric TDD subframe 801 at times $T_3$, $T_5$, and one or more pilot or null tones may be communicated in the UL-centric TDD subframe 851 at times $T_4$, $T_6$. As illustrated in FIG. 8, the one TDD subframe may be communicated at least partially concurrent with another TDD subframe.

On the other hand, at block 908, the apparatus may determine to adjust the structure of the TDD subframe. For example, the apparatus may adjust a time or subcarrier allocated for a control channel, data, and/or a reference signal. Non-limiting examples of such a reference signal include a UERS, a channel state information-reference signal (CSI-RS), and a sounding reference signal (SRS). In some examples, the reference signal may be time-aligned with the DMRS of an UL-centric TDD subframe communicated by another apparatus. For example, instead of communicating the reference signal at time $T_1$, as may be performed in existing configurations illustrated in FIG. 6, the reference signal may be communicated at a subsequent time $T_2$, which is time-aligned with the DMRS of the UL-centric TDD subframe 751, as illustrated in FIG. 7. As such, the reference signal can capture interference from the UL-centric TDD subframe 751 in a manner that is more accurate than the manner that interference is captured using the reference signal in existing configurations.

In some configurations, at block 910, the apparatus may utilize the reference signal for inter-link MU-MIMO when the reference signal is orthogonal to the DMRS. For example, referring to FIG. 7, the time-aligned UERS and DMRS may enable inter-link MU-MIMO when the UERS is orthogonal to the DMRS. Inter-link MU-MIMO may be enabled by assigning orthogonal ports to the DL reference signal (e.g., UERS) and UL reference signal (e.g., DMRS).

The methods and/or processes described with reference to FIG. 9 are provided for illustrative purposes and are not intended to limit the scope of the present disclosure. The methods and/or processes described with reference to FIG. 9 may be performed in sequences different from those illustrated therein without deviating from the scope of the present disclosure. Additionally, some or all of the methods and/or processes described with reference to FIG. 9 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Additional description pertaining to the present disclosure is provided in the Appendix filed concurrently herewith. The description herein is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. An apparatus configured for wireless communication utilizing a time-division duplex (TDD) carrier comprising a plurality of TDD subframes, the apparatus comprising:
   a transceiver;
   a memory; and
   at least one processor communicatively coupled to the transceiver and the memory, wherein the at least one processor is configured to:
      utilize the transceiver to receive signaling comprising information configured to indicate whether to adjust a structure of a TDD subframe; and
      if the information indicates adjusting the structure of the TDD subframe, adjust the structure of the TDD subframe in response to receiving the signaling;
      wherein adjusting the structure of the TDD subframe comprises adjusting a time or subcarrier allocated for one or more reference signals communicated in the TDD subframe;
      wherein adjusting the structure of the TDD subframe further comprises adjusting a time at which the one or more reference signals are communicated to be aligned with a time at which a demodulation reference signal (DMRS) of another TDD subframe is communicated by another apparatus.

2. The apparatus of claim 1, wherein adjusting the structure of the TDD subframe further comprises adjusting a time or subcarrier allocated for one or more control channels communicated in the TDD subframe.

3. The apparatus of claim 1, wherein adjusting the structure of the TDD subframe further comprises adjusting a time or subcarrier allocated for data communicated in the TDD subframe.

4. The apparatus of claim 1, wherein the one or more reference signals comprise at least one of a user equipment (UE)-specific reference signal (UERS), a channel state information-reference signal (CSI-RS), or a sounding reference signal (SRS).

5. The apparatus of claim 1, wherein the communication of the TDD subframe is at least partially concurrent with the communication of the other TDD subframe.

6. The apparatus of claim 1, wherein the at least one processor is further configured to:
   utilize the one or more reference signals for inter-link multi-user multiple-input multiple-output (MU-MIMO) when the one or more reference signals are orthogonal to the DMRS.

7. The apparatus of claim 1, wherein the information comprises control information carried in a control channel.

8. The apparatus of claim 1, wherein the information corresponds to quality of service (QoS).

9. The apparatus of claim 1, wherein the TDD subframe comprises a downlink (DL)-centric TDD subframe.

10. The apparatus of claim 1, wherein the TDD subframe comprises an uplink (UL)-centric TDD subframe.

11. A method of wireless communication utilizing a time-division duplex (TDD) carrier comprising a plurality of TDD subframes, the method comprising:
    receiving signaling comprising information configured to indicate whether to adjust a structure of a TDD subframe; and
    if the information indicates adjusting the structure of the TDD subframe, adjusting the structure of the TDD subframe in response to receiving the signaling;
    wherein adjusting the structure of the TDD subframe comprises adjusting a time or subcarrier allocated for one or more reference signals communicated in the TDD subframe;
    wherein adjusting the structure of the TDD subframe further comprises adjusting a time at which the one or more reference signals are communicated to be aligned with a time at which a demodulation reference signal (DMRS) of another TDD subframe is communicated by another apparatus.

12. The method of claim 11, wherein adjusting the structure of the TDD subframe further comprises adjusting a time or subcarrier allocated for one or more control channels communicated in the TDD subframe.

13. The method of claim 11, wherein adjusting the structure of the TDD subframe further comprises adjusting a time or subcarrier allocated for data communicated in the TDD subframe.

14. The method of claim 11, wherein:
    the information comprises control information and corresponds to quality of service (QoS); and
    the TDD subframe comprises at least one of a downlink (DL)-centric TDD subframe or an uplink (UL)-centric TDD subframe.

* * * * *